Figure 1:
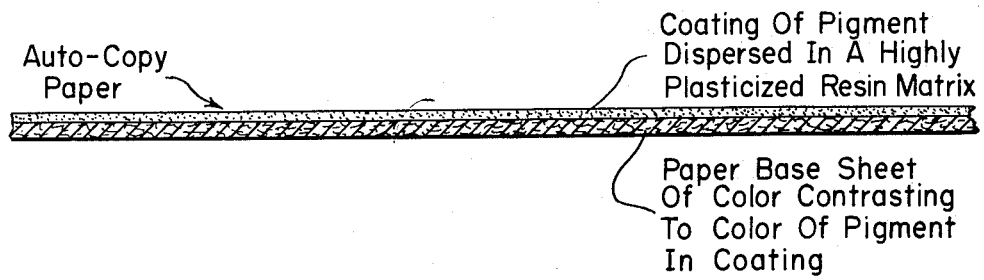
Figure 2:
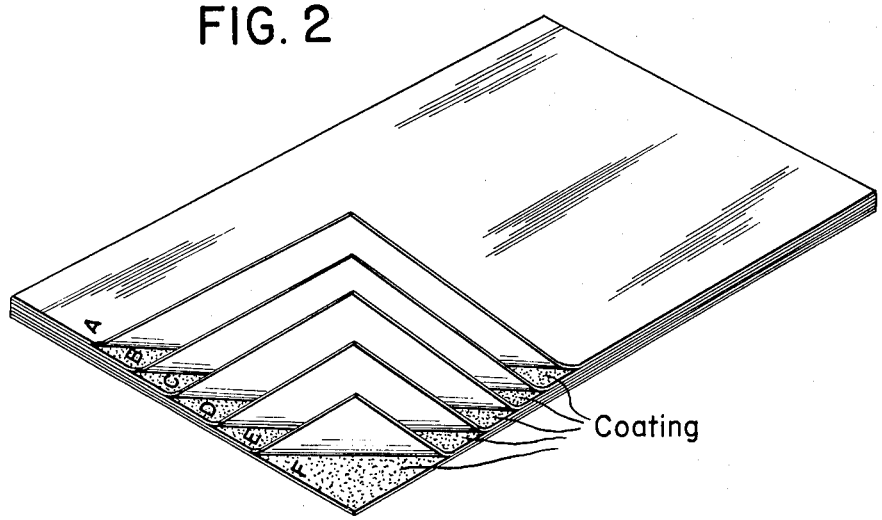

April 19, 1966   W. H. HOGE ETAL   3,247,006
PRESSURE SENSITIVE RECORD SHEET, METHOD
OF MAKING AND COMPOSITION THEREFOR
Filed Oct. 12, 1960

Marshall S. Barbour
William H. Hoge
INVENTORS

BY
ATTORNEYS.

United States Patent Office 3,247,006
Patented Apr. 19, 1966

---

3,247,006
PRESSURE SENSITIVE RECORD SHEET, METHOD OF MAKING AND COMPOSITION THEREFOR
William H. Hoge, Rumford, and Marshall S. Barbour, Livermore, Maine, assignors to Oxford Paper Company, Rumford, Maine, a corporation of Maine
Filed Oct. 12, 1960, Ser. No. 62,299
28 Claims. (Cl. 117—36.7)

This is a continuation-in-part of our prior application Serial No. 776,497, filed November 26, 1958, now abandoned.

This invention relates to pressure-sensitive, heat-resistant recording material and to the method of making the same. The invention broadly includes a coating composition comprised of a pigment dispersed in a matrix formed of a highly plasticized synthetic resin, the interrelation of the pigment and the matrix being such that when the coating is applied to a suitable base it is normally opaque and porous but becomes transparent wherever sufficient local pressure is applied to the coating such as with a stylus or typewriter keys, thereby producing a color contrast between the coating and the base at the transparentized area. The invention includes an article of manufacture which comprises a base having the porous pressure-sensitive, heat-resistant coating composition adhered thereto.

A paper which is capable of receiving an image directly without the use of carbon paper or other outside means is generally referred to in the art as carbonless paper or autocopy paper. Prior attempts to produce a commercially acceptable autocopy paper have not been successful since they have been deficient in one or more properties rendering them commercially unacceptable. In some instances these prior autocopy papers would not be sufficiently sensitive to permit the production of a sufficient number of copies or to produce a sufficiently clear and distinct image. Other disadvantages of these prior autocopy papers include poor printability, uniformity, storage stability, moisture resistance, permanence, scuffing resistance, lack of heat stability, and so forth.

The object of this invention is to provide a pressure-sensitive, heat-resistant recording material which can be used directly to make copies without the use of carbon paper, ribbon, ink, or other outside marking means and which will form an image by the application of pressure without removing anything from the working surface and which will have the necessary properties required by the end users.

The pressure-sensitive recording materials of this invention are sufficiently sensitive to localized pressure, from a typewriter key for example, to produce at least eight or more clear, legible copies and remain workable after brief exposures to heat at sufficiently high temperature to char the paper. The pressure-sensitive materials retain their pressure sensitivity and are very stable under variable storage conditions. They do not become soft or sticky under extremely hot and humid conditions nor do they become hard or brittle at freezing temperatures. The pressure-sensitive materials are also highly moisture resistant and will not permanently fingerprint during normal use. The dried pressure-sensitive coating can be printed on by conventional printing methods such as offset without picking or causing removal or injury in any way to the coating. Where the image is formed by pressure it arises from transparentization of the porous coating. This occurs simply by compaction of the coating in the image area with substantially no lateral movement in the coating or removal of the coating from the image area. The pressure-sensitive coatings of this invention are useful wherever there is a need for opacity which can be eliminated through a pressure impulse.

The recording material of this invention can be used to produce copies by stacking a number of sheets having the pressure-sensitive, heat-resistant coating adhered thereto with the coating facing the back of each sheet immediately above and applying the pressure to the top sheet. The top sheet may be a standard coated or non-coated paper. The application of pressure to the top sheet by means of a stylus or typewriter key results in the reproduction of the character impressed thereon on the face of each under sheet by transparentization of the coating. The recording material can also be used in the top position of one or more sheets and the top sheet imaged directly without the use of ink or other marking material.

The operation of the coating material of this invention can be more clearly understood by reference to the drawing. The master sheet shown in the drawing has a number of different characters reproduced thereon by means of a typewriter. Immediately under the master sheet are a number of sheets of paper having the pressure-sensitive, heat-resistant coating composition adhered thereto. The coating on each of the sheets under the master sheet faces the back of the master sheet. The application of pressure by means of a typewriter key to the face of the master sheet results in the transparentization of the coating on each of the pressure-sensitive undersheets as shown resulting in a duplication of the character impressed on the face of the master sheet.

The pressure-sensitive coating compositions of this invention are prepared from proper amounts of pigment, resin, and plasticizer. Such a coating is generally milky in color when applied wet in an emulsion form but becomes opaque when it dries having the color of the pigment particles which are evenly distributed through it embedded in the resin-plasticizer matrix. Rewetting of the dried coating causes the coating to again become fairly transparent but the coating returns to the opaque condition when it is again dried. When it is subjected to local pressure, as in writing or typewriting, the dried coating becomes transparent again in the areas where the pressure is applied. The mechanism by which this happens is, we believe, that the dried coating as applied has a porous structure which, on a microscopic scale, is not too different from that of a porous cellulose sponge. The holes in the coating appear to be air pockets, and the presence of the finely divided voids results in many light scattering interfaces which give opacity to the coating. The coating is deformed by local pressure and this closes the voids removing the air-coating interfaces which cause opacity. The resulting coating is thus transparentized and the base, generally being of a relatively different color shade from the coating and usually darker, is visible in the compressed areas. During the drying of the coatings the water is removed causing less of a film thickness decrease than is encountered in normal coatings. The amount of decrease in the thickness of the coating on drying will depend to some extent on the amount of dilution water used. Removal of the water will decrease the thickness until a solids content is reached where the pigment will prevent further thickness reduction.

The coating compositions of this invention can be applied to a suitable base, preferably paper, in the wet state by conventional coating techniques, as will be apparent to those skilled in the art. Advantageously, the base is dyed or coated so as to obtain a color contrast between the opaque pressure sensitive coating and the base.

It has been found that the pick-resistance of the pressure sensitive coating is increased when the base has been coated with a polyvinyl acetate coating or a coating containing polyvinyl acetate as an adhesive. For example, a polyvinyl acetate homopolymer in the form of a 55 percent solids aqueous emulsion marketed by Du Pont under the trade name Elvacet-81900 can be used.

The coating compositions can generally be applied to a suitable base such as paper as a very thin coating comparable to a 15 pound office bond coated paper. Coating thicknesses of betwen approximately 0.004 and 0.0015 inch are readily obtainable which permits a considerable reduction in bulk and storage of the imaged or unimaged papers over other carbonless or autocopy papers. Advantageously the pressure-sensitive coated paper can be further coated with about a ¼ to ½ pound coating of a light-weight clear material such as casein to obtain improved scuff resistance and improved bond.

The term matrix as used herein refers to the deformable non-pigment portion of the coating. The essential ingredients of the matrix material are a resin and a plasticizer for the resin. Most thermoplastic resinous materials, either synthetic or natural, can be used as the resin portion of the matrix provided they can meet the requirements of the matrix portion of the coating. Similarly, most known plasticizers can also be used so long as they are sufficiently compatible with the resin used and will also meet certain requirements of the matrix portion of the coating. Since numerous different types of resinous material as well as numerous different types of plasticizers can be used according to this invention, it is convenient to define the properties desired in the ultimate resin-plasticizer combination to aid those skilled in the art in the resin and plasticizer selection.

The matrix should have the ability to resist hardening due to oxidation or high temperatures. Hardening of the matrix material changes the flexibility of the coating, and if the flexibility is sufficiently altered this in turn causes a change in the response of the coating to a given pressure impulse. Since as a practical matter most of the pressure-sensitive coatings produced according to this invention will be formulated within a given range of sensitivity, change in this sensitivity due to oxidation and so forth is not desirable property.

It is preferable that all of the components of the matrix, including special additives hereinafter disclosed, be non-volatile. Volatile materials present in the matrix tend to evaporate causing loss of the desirable properties for which they were originally incorporated into the matrix.

The matrix components should not be capable of chemicaly reacting with each other, the pigment, or the base such as paper in any adverse manner.

It is also desirable that the matrix be made up entirely of water-insoluble materials or materials which become water insensitive after the coating has been applied and dried. Water-sensitive materials have a tendency to migrate into a base such as paper under conditions of varying humidity and to thus cause a change in the sensitivity of the pressure-sensitive coating. Some water-sensitive special additives, however, can be used to advantage as hereinafter discussed. Water-sensitive materials can also be used in a matrix when a suitable water-insensitive base is employed for the resulting coating.

The materials of the matrix should also be completely compatible with each other in the proportions used to prevent sweating out or crystallization thereof.

The matrix should also have the ability to sufficiently bind the pigment particles to obtain satisfactory resistance to scuffing and satisfactory ink pick resistance for later converting and printing operations.

The matrix should also be very flexible and have good lubricating properties. A given level of pressure sensitivity can be obtained with a relatively small amount of a highly flexible matrix having good lubricating properties or with a substantially greater amount of a stiffer matrix material which does not have quite as good lubricating properties. The opacity of the pressure-sensitive coatings can be reduced by increasing the amount of matrix employed, and thus a highly flexible matrix does a better job of obtaining high sensitivity and at the same time retaining high opacity and other advantageous properties than a more stiff matrix material.

The particular resin and plasticizer employed can be selected by those skilled in the art by routine experimentation bearing in mind the qualities and properties desired as disclosed herein.

The plasticizers which can be used are generally liquid and are generally selected on the basis of compatibility with the resin being used as well as the flexibility and other properties obtainable thereby.

Plasticizers are non-volatile solvents for resins. Some of them are liquids of low viscosity and some are quite viscous while others are crystalline solids. Crystalline solid plasticizers can be used according to this invention as hereinafter disclosed. Liquid plasticizers are characterized by low vapor pressure to prevent evaporation, extremely high boiling points, and excellent compatibility with certain types of resins.

A great variety of different plasticizers can be used according to this invention, and the particular plasticizer employed will depend upon its compatibility with the resin being used as well as upon the other desirable properties of the coating compositions of this invention. Some examples of plasticizers which can be used include the phosphate plasticizers such as octyl diphenyl phosphate, cresyl phenyl phosphate, triphenyl phosphate, tricresyl phosphate, triethyl phosphate, and so forth; and phthalate esters such as butyl benzyl phathalate, di(n-octyl) phthalate, dibutyl phthalate, diisodecyl phthalate, diphenyl phthalate, di(n-decyl) phthalate, diocytl phthalate, dicyclohexyl phthalate, and so forth. Diethyl and dimethyl phthalate can also be used, but these plasticizers are fairly volatile and are not as advantageous as the other less volatile phthalate ester plasticizers. Further examples of plasticizers which can be used include the sulfonamide plasticizers such as N-cyclohexyl toluene sulfonamide and N-ethyl toluene sulfonamide; the adipate plasticizers such as dioctyl adipate, diisodecyl adipate, diisobutyl adipate, and butoxyethyl adipate; the sebacate plasticizers such as dibutyl sebacate, dioctyl, dioctyl sebacate, and so forth; and the glycolate plasticizers such as ethyl phthalyl ethyl glycolate. Further examples of plasticizers which can be used include pine oil derivatives, orthonitrobiphenyl, chlorinated paraffin, hydrogenated rosin methyl esters, chlorinated polyphenyls, castor oil, acetylated castor oil, butyl acetyl ricinoleate, acetyl tributyl citrate, glycerol triacetate, and so forth.

The above list of specific examples of plasticizers which can be used includes most of the well-known and commercially available plasticizers, but other plasticizers can of course be used as will be readily apparent to those skilled in the art.

Since a high compatibility with the particular resin used is important, the plasticizers which can be used will mainly consist of the so-called primary plasticizers. Secondary plasticizers such as partially hydrogenated alkylaryl hydrocarbons and partially hydrogenated mixed terphenyls can also at times be used to advantage in forming the coating compositions of this invention in conjunction with a so-called primary plasticizer.

Whether or not a particular plasticizer will meet the properties desired for the coating compositions of this invention with a particular resin can best be determined by trying it on a coating and eliminating those which would not be desirable by routine experimentation.

As a guide for screening plasticizers and finding a suitable plasticizer for the particular resin, it is first desirable to test the plasticizer for compatibility with the resin. If the resin can imbibe a large quantity of plasticizer, a suitable resin-plasticizer matrix material has probably been obtained. The compatibility of the plasticizer can be determined by preparing a coating with a resin-plasticizer mixture and observing whether the plasticizer sweats out or if it leaves the coating and penetrates through an untreated supporting paper base. A suggested test can be made by mixing the resin with approximately 200 percent plasticizer based on the resin solids and allowing this mixture to stand for several hours with mild agitation to allow the plasticizer to be thoroughly imbibed by the resin. This mixture can then be smeared on a sheet of non-grease-proof paper and the penetration of the plasticizer through the paper observed for several hours. If the plasticizer rapidly penetrates through the paper, the plasticizer would probably not be sufficiently compatible for forming the coating compositions of this invention. For example, a polyvinyl acetate copolymer such as Borden's Polyco 678-W containing 200 percent butyl benzyl phthalate has good compatibility and the plasticizer will not penetrate through the paper base. By contrast, a mixture of the same resin with 200 percent mineral oil yields a mixture which is incompatible and allows the oil to rapidly penetrate through the paper.

Another screening test can be used to eliminate materials with high water sensitivity. The above compatibility test can be used in which such a mixture is tested under damp conditions. If the resin-plasticizer matrix is compatible and remains so under high humidity, it is possible to store these coatings for 24 hours at conditions of 95% relative humidity and 100° F. without any change in the sensitivity of the coating. Complete pressure-sensitive formulas can also be prepared and tested to determine if there is any significant change in the pressure sensitivity of the coating upon aging for 24 hours at 95% relative humidity and 100° F. If the plasticizer migrates, the most common effect is an increased opacity in the finished coating plus a drop in sensitivity. The high humidity test eliminates such materials as glycerine and many of the water-dispersible oils which exhibit plasticizing effects but which contain hydrophilic groups to render them water dispersible.

Thermoplastic resinous materials can be used to form the pressure-sensitive papers according to this invention so long as the resin is capable of being plasticized to the necessary extent and does not interfere with or adversely affect the objects of this invention. Examples of thermoplastic resinous materials which can be used include cellulosic resins such as cellulose nitrate, cellulose acetate, cellulose acetate-butyrate, and ethyl cellulose; vinyl resins such as polyvinly acetate, polyvinyl benzoate, polyvinyl butyrate, polyvinyl stearate, polyvinyl acetal, polyvinyl formal, polyvinyl butyral, polyvinyl chloride, polyvinylidene chloride, and so forth; acrylic resins such as polymethyl acrylate, polyethyl acrylate, polymethacrylate, polymethylmethacrylate, polyacrylonitrile, and so forth. Further examples include polystyrene; polyamides; chlorinated rubber; and so forth. Thermo-setting resins can also be used so long as they have the ability to be plasticized to a soft flexible adhesive and retain the ability to be flexible and hold the plasticizer.

Various copolymers of the above resins as well as mixtures or blends can also be used according to this invention. Some examples of copolymers which can be used include copolymers of styrene-butadiene, styrene-acrylonitrile, and so forth; copolymers of vinyl acetate with vinyl chloride, vinyl benzoate, crotonic acid, maleic anhydride, dimethylmaleate, diethylmaleate, butylacrylate, vinyl crotonate, vinyl stearate, and so forth; and copolymers of vinyl chloride with, for example, methyl acrylate, ethyl acrylate, butyl acrylate, vinylidene chloride, and so forth.

The formation of the voids in the coating compositions is primarily a function of the pigment. Certain pigments can be used satisfactorily and others cannot. The workable pigments can be characterized to some extent by certain physical properties which they possess, but the true test as to whether or not a pigment will be operative according to this invention is to try it in a coating and see whether or not the pigment when used according to this invention will produce the desired results. Workable pigments can thus be readily determined by those skilled in the art by routine experimentation.

Since the ultimate test, insofar as we have been able to determine, of the operativeness of the pigment is to try it in a coating, the pigments which can be used are best described by their function in the resin-plasticizer matrix. The pigment employed should be capable of forming a porous coating and capable of obscuring the color of the base coat by porosity or light-scattering properties in the resin-plasticizer environment. The coating should also be capable of producing an opaque coating when laid down and dried on a surface of a color contrasting to the color of the base sheet. Contrasting colors can, of course, also be obtained by varying the color of the base sheet so that it will contrast with the color of the pigment. The pigment in its resin-plasticizer environment should also be capable of being compressed or be sensitive to pressure and become transparentized by the local application of pressure. The pigment should also not possess the property of rendering the coating sensitive to heat nor should the pigment impart to the coating any property which would adversely affect the ultimate properties desired in the copying papers of this invention.

The physical nature of the pigment can be used as a guide in determining whether or not a particular pigment can be used to form the copying papers of this invention. The physical natures of the pigment such as size, shape, presence of aggregates, surface area, refractive index, brightness of the pigment, and opaqueness are all qualities which in combination determine to some extent its operation.

The pigment must have the ability of forming a porous coating in combination with the matrix upon drying. The ability of a pigment to form a porous coating in combination with a particular matrix can be determined by those skilled in the art by routine experimentation.

The surface area of the pigment generally determines the amount of adhesive or matrix required to wet or surround the particles. The most finely divided pigments have the greatest surface area. If a pigment is used which is too fine, it is capable of close packing and will tend to form a closely consolidated, more dense coating. If, however, the fine particles are present as aggregates, a combination of a large pigment surface area and non-packing nature is possible since the presence of the aggregates will permit a more porous film of a sufficiently opaque nature to hide the contrasting color of the base sheet.

Generally as the surface area of the pigment decreases the apparent density of the coating increases and the porosity decreases. The coating thus becomes more consolidated, contains less voids, and is more transparent. It is thus desirable to utilize a pigment having a sufficiently large surface area or one which is in the form of aggregates so that it is capable of forming a porous or opaque film.

The refractive index of the pigment has an important bearing on the ability of a coating to be transparentized. Generally we have found that pigments having a refractive index substantially the same as or similar to the matrix material can be used in the practice of this invention. Most of the matrix materials we have used have a refractive index of between about 1.45 to 1.55, and when using such matrix materials we have found that it is advantageous to use a pigment having a refractive index below about 1.6. Pigments having a refractive index much above the refractive index of the matrix begin to lose their ability to be transparentized in the plasticized resin environment by the application of pressure and have generally been found to be inoperative. This does not mean, of course, that all pigments having a refractive index below about 1.6 would be operable under such circumstances. For example, if a pigment was used having a refractive index below about 1.6 in a matrix having a refractive index of about 1.55 but yet did not form a porous coating when dried, it would not be operable since it would not obscure the color of the base sheet.

The refractive indices of the pigment and matrix must be sufficiently close or similar to allow transparentization of the coating when compacted by pressure. Operable matrix-pigment combinations can be readily determined by those skilled in the art by routine experimentation.

We have generally found that the most preferable pigments possess a refractive index of from about 1.4 to about 1.6 and a minimum surface area for single shaped particles of between about 30,000 and 35,000 sq. cm. per gram. A tendency to aggregate as indicated by a minimum relative sediment volume for a milled dispersion of about 3.00 has also been found to be generally preferable.

In general, we have found that the workable pigments possess a refractive index substantially the same as or similar to the refractive index of the matrix materials, and that for the majority of matrix materials which we have used such as the polyvinyl acetate homopolymer-phthalate matrix workable pigments possess a refractive index of from about 1.4 to about 1.6.

From the standpoint of forming porous coatings, we have also found that it is advantageous to use a pigment having a minimum surface area for a single shaped particle of between about 30,000 and 35,000 sq. cm. per gram measured by the air permeability technique and a tendency to aggregate as indicated by a minimum relative sediment volume for a milled dispersion of about 3. As stated above, the ultimate test with respect to the workability of the pigment is to try it in a matrix material. The above figures with respect to the surface area and relative sediment volume are thus not considered to be a limiting factor but are to be used as a guide in the determination and selection of workable pigment-matrix conditions.

The specific figures given above are set forth for the purpose of leading and teaching those skilled in the art to the best of our ability, and are not to be considered a limiting factor. Other pigments having properties outside those referred to above could be used so long as they will function as disclosed herein. As discussed above, the ultimate test with respect to the operability of the pigment is to try a coating.

Some examples of pigments which can be used in the practice of this invention include silica, calcium silicate, diatomaceous earth, Raffold pigment (calcium carbonate and magnesium hydroxide), hydrated alumina, magnesium carbonate, satin white (slaked lime and alum), magnesium aluminum silicate, sodium aluminum silicate, flue gas calcium carbonate, and so forth. Mixtures of various pigments can also be used.

Pigments are frequently commercially purchased under various trade names. Some examples of trade-named pigments which we have successfully used in the practice of this invention include silicas marketed under the trade names Hi-Sil and Santocel by Columbia-Southern Chemical Corp. and Monsanto Chemical Co., respectively, a hydrated calcium silicate marketed under the trade name Silene by Columbia-Southern Chemical Corp., a diatomaceous earth marketed under the trade name Cellite by Johns-Manville Sales Corp., a calcium magnesium silicate marketed under the trade name Attasorb by Mineral & Chemical Corporation of America, and a flue gas calcium carbonate marketed under the trade name Albacar 5970 by New England Lime Company.

For reasons which are not particularly clear to us, magnesium carbonate and satin white are very advantageous pigments and work surprisingly better than the others. These pigments result in an original coating of high opacity and are very easily deformed by pressure to yield an image of great contrast.

We have also found that it is advantageous to incorporate various special additives into the coating formulations of this invention. These special additives can serve various purposes such as facilitating the preparation of the formula, the application of the formula to a suitable base, and also improving or changing in various respects the ultimate properties of the dried pressure-sensitive coating.

The inclusion of an emulsifying agent to more readily permit the incorporation of the water-insoluble plasticizers into the formulas is advantageous. The addition of a small amount of an oily emulsifier to the plasticizer makes the plasticizer water dispersible. Generally about 10 percent of an oily emulsifier based on the weight of the plasticizer is sufficient to accomplish this. The emulsifying agent acts as an extender for the plasticizer. The selection of a particular emulsifying agent has very little effect on the pressure-sensitive coating's properties, and its main purpose is to permit ease of mixing and to improve coatability. It is preferable to use as little emulsifying agent as possible to prevent the coating from becoming too water sensitive and susceptible to finger prints. Some emulsifying agents will produce a more water-sensitive coating and one more susceptible to finger prints than other emulsifying agents, and an emulsifying agent should be selected which will not render the resulting coating too water sensitive. Some examples of emulsifying agents which can be used include alkylaryl polyether alcohols such as that marketed by Rohm & Haas under the trade name Triton X-100 and Union Carbide under the trade name Tergitol NP-14, sorbitan monopalmitate polyoxyalkylene derivatives and sorbitan monopalmitate, both marketed by the Atlas Powder Company under the trade names Tween 40 and Span 40, respectively.

Protective colloids can also be used in the formulations of this invention to advantage. The protective colloids act as a stabilizer for the plasticizer emulsion and also act as a stiffening agent for the dried coating to give improved scuffing resistance. We have found that polyvinyl alcohol works very well in the formulations of this invention. Other protective colloids can, of course, be used including starch, casein, hydroxyethyl cellulose, polyacrylamide, and so forth. The particular colloid selected should not of course adversely affect the pressure-sensitive coatings of this invention. Colloids which tend to react with or adversely affect the pigments used, for example, should be avoided. For example, casein reacts with satin white, and although such a combination is definitely workable, the resulting coatings change slightly in sensitivity with age. When using satin white as a pigment it is thus desirable to avoid casein in the combination or use it in minimum quantities.

Other special additives can also be used to advantage such as dispersing aids to help in the dispersion of the pigment. For example when satin white is employed as a pigment, we have found that sodium hexametaphosphate (Calgon) can advantageously be employed to aid in dispersing the pigment in water.

Some of the compositions prepared according to this invention may tend to be foamy, and this can be readily overcome, as will be apparent to those skilled in the art, by the addition of a suitable defoamer such as butyl alcohol, tributyl phosphate, and so forth.

If the resulting pressure-sensitive coating prepared is not sufficiently water repellant for the purpose for which it is intended or if the coating is unduly sensitive to moisture and finger printing, a small amount of a wax emulsion can be incorporated into the formulations to generally improve the water repellant nature of the coating and to prevent finger printing. Other materials of course can be added to accomplish this as will be understood by those skilled in the art.

In order to form the pressure-sensitive coating compositions of this invention the matrix resin must be highly plasticized. The exact amount of plasticizer which can be used can be varied quite widely as can readily be determined by those skilled in the art by routine experimentation. The plasticizer should be in sufficient proportion to the resin so that when the plasticized resin is mixed with the pigment a porous film or coating can be formed which is properly pressure-sensitive. The amount of plasticizer will of course vary depending upon the particular resin being used. Some resins are very soft and act as if they are already plasticized to some extent. Such resins, as well as internally plasticized resins will not require as much plasticizer as a stiff resin such as a high molecular weight polyvinyl acetate homopolymer.

Generally, we have found that a plasticizer-resin ratio of between about 1:3 to 5:1 can be advantageously used. The plasticizer-resin ratio which can be used is quite wide due to the fact that some resins are very soft and others are quite stiff, as described above.

The presence of other materials such as protective colloids and emulsifying agents will also have an effect on the optimum plasticizer-resin ratios which can be used. Small amounts of protective colloids act somewhat as the resin itself while small amounts of emulsifying agents act as a plasticizer. Thus when small amounts of protective colloids or emulsifying agents are used they can to some extent be considered part of the resin and plasticizer, respectively.

The amount of pigment which can be employed with the matrix material to form the coating compositions and products of this invention can also be varied quite widely depending upon the particular pigment and matrix material being used. The minimum amount of pigment should be sufficient to render the coating porous, opaque, and pressure sensitive. As the amount of pigment is increased the pressure sensitivity of the resulting coatings are correspondingly decreased. For any particular pigment-matrix composition the amount of pigment which can be used can be determined by routine experimentation by those skilled in the art. Generally, we have found that it is advantageous to use a pigment-matrix ratio of between about 1:3 to 2.5:1. This pigment-matrix ratio is particularly advantageous when using a matrix material composed of polyvinyl acetate and a butyl benzyl phthalate plasticizer with a satin white pigment.

This invention also includes the use of pigment extenders. The term pigment extenders as used herein refers to certain pigments which may advantageously be used in conjunction with the pigments discussed above. These pigment extenders are pigments which are easily deformable but do not create sufficient porosity or pressure sensitivity in the coating when used alone. They can be used in minor amounts up to about 15 or 20% of the total pigment in order to increase the total pigment content without decreasing the pressure sensitivity of the coating. An economy is thereby achieved by increasing the total pigment content in such a manner. Moreover, the pigment extender can be used to increase the opacity of the pressure-sensitive coating, thereby achieving greater brightness and even an improvement in the pressure-sensitive properties of the coating. Such pigment extenders can readily be determined by one skilled in the art by routine experimentation. The pigment extenders should not possess the property of rendering the coating sensitive to heat nor should they impart to the coating any property which would adversely affect the ultimate properties desired in the copying papers of this invention. The ultimate test with respect to the operability of the pigment extenders is simply to try a coating. It has been found that pigments which might be expected to be operative in forming the pressure sensitive coatings of this invention, but which are found to be inoperable when used alone, may then be expected to be advantageously employed as pigment extenders. On the other hand, pigments which would be expected to be inoperative in forming the porous pressure sensitive coatings when used alone, may then be expected to have no particular utility as pigment extenders having the property of imparting improved pressure sensitivity to the coatings when used in minor amounts in relation to the total pigment content. One skilled in the art therefore may readily determine which pigments may be advantageously used as the pigment extenders of this invention.

Some examples of the pigment extenders which can be used in the practice of this invention include calcium stearate, clays such as that marketed by the Southern Clay Company under the trade name Lustra Clay, magnesium silicate and so forth. Mixtures of these extenders can also be used.

The amount of pigment extender which most advantageously can be used will depend upon the particular extender employed. For example, minor amounts up to about 15 percent or more by weight of clay or talc, based on the total weight of pigment, has been advantageously employed without substantially adversely affecting any of the ultimate properties desired in the coating. Calcium stearate has advantageously been used in somewhat higher amounts. The pigment extenders can be used in addition to, or in place of a portion of, the pigments discussed above, so that when a pigment extender is employed, the advantageous pigment-matrix ratio of 1:3 to 2.5:1 discussed above can be somewhat higher depending on the amount of pigment extender added. At present, it has been found that the pigment content of the coating composition can advantageously be increased by as much as 20 percent or more by the use of pigment extenders.

This invention also includes the use of solid crystalline compatible plasticizers in the pressure-sensitive, heat-resistant, matrix-pigment coatings. Such heat-resistant, pressure-sensitive coatings can only be used in the manner contemplated by this invention after the plasticizer has been melted to a liquid state. This is very advantageous in some instances since such autocopy papers can be rendered sensitive by heating them to melt the plasticizer and while the plasticizer is in the liquid state they can be marked quite readily. The pressure sensitivity can be retained for several hours after melting the crystalline plasticizer, and the specific sensitivity period will depend upon the particular plasticizer used in the pigment-matrix composition. The sheet, after sensitizing by heat and marking, then reverts on standing to a less sensitive state upon solidification of the plasticizer resulting in a marked sheet having improved handling characteristics. An example of such a solid crystalline plasticizer is diphenyl phthalate which has a crystallizing point of 69° C. The use of diphenyl phthalate results in a relatively pressure-insensitive coating at normal temperatures, but one which can be rendered sensitive by heating the coating to melt the diphenyl phthalate and revert to the pressure-insensitive state upon resolidification of the diphenyl phthalate. The same pigments and compatible resins can be used when employing solid crystalline plasticizers as with the liquid plasticizers as described above. The solid crystalline plasticizer should, of course, have a crystallizing point of a sufficiently low temperature so that the base or other elements of the coating composition would not be destroyed by the temperature necessary to melt the solid plasticizer to render it liquid and the coating sensitive.

The opaque, pressure-sensitive coatings of this invention can be sandwiched between transparent films such as cellophane and a black coating. This would give a product in which the image is viewed through the transparent film and will give adequate protection to the pressure-sensitive coating in applications where picking and scuffing resistance have increased importance. The pressure-sensitive coatings of this invention can also be applied to a transparent substrate which does not contain a contrasting color. The contrasting color might be present in some unattached underlying surface. A coating of this type would have areas of high and low opacity and which could be used as a transparent film for projecting screen images, for example.

Various other modifications can be made according to this invention and the pressure-sensitive coatings are generally applicable in any place where there is a need for opacity which can be eliminated through a pressure impulse.

Since the films and coatings of this invention are porous they are also useful as porous plastic films and coatings in those areas where porosity is desirable or essential such as upholstery, filters, battery separators, and so forth. In formulating the coatings and films of this invention for such uses other than as autocopy papers, the formulations can be considerably altered as will be apparent to those skilled in the art. The choice of resin, plasticizer, and pigment as well as other special additives will be selected with a view toward obtaining the desired porosity and the particular use for which the porous coating or film is to be prepared, and little attention need be paid to the pressure sensitivity of the paper if this is an ultimate property which is not necessary or desirable.

This invention also includes the use of solvent-based coatings. The particular solvent used will be determined by the particular resin and plasticizer selected for the matrix material. Various solvents can be used such as toluene as will be apparent to those skilled in the art.

The following specific examples describe in detail the preparation of various coating compositions and pressure-sensitive recording material according to this invention. All parts are by weight.

*Example 1*

A pigment mix was prepared by adding 21.25 parts of a 29.4 percent aqueous solution of sodium hexametaphosphate (Calgon) to 500 parts of a 38 percent solids satin white suspension together with 7.3 parts of a 10 percent solution of casein. The above components were thoroughly mixed together until a smooth mixture was obtained.

7.3 parts of polyvinyl alcohol (Lemol 5–88, marketed by Borden) were added to a sufficient amount of cold water to form a 10 percent solution and mixed therein until the polyvinyl alcohol was thoroughly wet-out. The temperature of the mixture was then raised to between 140 and 170° F. with agitation and held at that temperature until the polyvinyl alcohol was completely dissolved. The polyvinyl alcohol solution was then cooled to room temperature and added to a mixture of 60 parts butyl benzyl phthalate and 7.3 parts of an alkyl aryl polyether alcohol (Triton X–100, marketed by Rohm & Haas) with agitation to form a water-in-oil type emulsion.

The pigment mix as prepared above was then slowly added to the water-in-oil emulsion until the emulsion inverted to an oil-in-water type after which the remaining pigment mix was more rapidly added.

44 parts of a polyvinyl acetate homopolymer (Elvacet 81–900) was then added to the oil-in-water emulsion and the solids content adjusted to produce a composition of coatable consistency. The resulting emulsion was then homogenized. 2.85 parts of a cationic size marketed by the American Cyanamid Company under the trade name Cyron was dissolved in water to make a 3 percent solution and the Cyron solution added to the emulsion just prior to the application of the emulsion to the base. The Cyron can be replaced by 8.2 parts of a wax emulsion (50 percent solids) marketed by American Cyanamid under the trade name Alwax 200.

The coating emulsion so prepared was then applied to a black paper base and air dried. The dried coating was opaque, white in color, and obscured the black base paper on which the coating was applied. The coating thickness was approximately 0.001 inch.

Eight pieces of paper having the pressure-sensitive coating thereon were assembled one on top of the other with the pressure-sensitive coating facing the back of each sheet immediately above. A standard coated piece of bond paper was placed as the top sheet and the assembled papers placed in a conventional typewriter so that the untreated paper will receive the direct original images from the typewriter keys. Upon striking the top sheet of paper and imaging the same by means of the typewriter keys, an identical image was produced on the coated surface of each underlying coated paper. The images were all clear and distinct and permanent. The coated papers produced according to this example were also insensitive to heat at temperatures above the charring temperature of paper, and tests showed that the papers maintained their sensitivity under both very hot and humid and freezing storage conditions. The coatings were also moisture resistant, and, when printed upon by conventional offset methods, no picking or injury to the coating was observed.

Pressure-sensitive coating papers of varying sensitivity were also prepared in an identical manner as set forth in Example 1, but substituting 35.7 parts of butyl benzyl phthalate in one instance and 90.0 parts of butyl benzyl phthalate in the second instance for the 60 parts used in Example 1. The pressure-sensitive paper using the 35.7 parts of butyl benzyl phthalate possessed substantially the same properties as the paper produced according to Example 1 but possessed a lower sensitivity. The pressure-sensitive paper using the 90.0 parts of butyl benzyl phthalate also possessed substantially the same properties as the paper produced according to Example 1 but resulted in a coating having a higher sensitivity.

*Example 2*

A pigment dispersion was made up in the same manner as set forth in Example 1 using 100 parts of satin white paste (38% solids), 12.3 parts of water, 0.2 part of Calgon, and 2.5 parts of a 15% aqueous casein solution.

A resin-plasticizer matrix was then prepared in the same manner as set forth in Example 1 using 60.0 parts of a polystyrene emulsion (50 percent solids) marketed by the Monsanto Chemical Company under the trade name Lytron S-2, 15.0 parts of a 15% aqueous casein solution, 75.0 parts of a dihydromethyl abietate marketed by the Hercules Powder Company under the trade name Hercolyn, and 75.0 parts of water.

115.0 parts of the pigment dispersion as prepared in this example were then slowly added to the water-in-oil polystyrene-plasticizer matrix emulsion until the emulsion inverted to an oil-in-water type and to which the remaining pigment was more rapidly added.

The coating emulsion so prepared was then applied to a black paper base and air dried. The dried coating was pressure sensitive and possessed similar properties to the coating produced according to Example 1.

*Example 3*

A resin-plasticizer matrix emulsion was prepared in the same manner as set forth in Example 1 using 2.5 parts of an alkyl aryl polyether alcohol (Triton X–100), 12.5 parts of a chlorinated polyphenyl marketed by the Monsanto Chemical Company under the trade name Aroclor 1248, 11.0 parts of a polyacrylate resin emulsion (46 percent solids) marketed by Rohm & Haas Company under the trade name Rhoplex B-15, and 12.5 parts of water.

100 parts of a pigment dispersion prepared in accordance with the pigment dispersion in Example 2 were then slowly added to the water-in-oil polyacrylate-plasticizer matrix emulsion as prepared above until the emulsion inverted to the oil-in-water type after which the remaining pigment was more rapidly added.

The coating emulsion so prepared was applied to a black paper base and air dried. The resulting product was pressure sensitive and possessed similar properties to the paper produced according to Example 1.

*Example 4*

A resin-plasticizer matrix emulsion was prepared in the same manner as set forth in Example 1 using 14.0 parts of a chlorinated paraffin marketed by the Diamond Alkali Company under the trade name Chlorowax 40, 1.4 parts of an alkaryl polyethylene glycol ether marketed by Union Carbide Chemical Co. under the trade name Tergitol NP–14, 25.0 parts of a 10 percent aqueous solution of polvinyl alcohol (Lemol 5–88), 25.0 parts of a 3 percent aqueous solution of Cyron, 19.0 parts of a styrene-butadiene resin emulsion (48 percent solids) marketed by the Dow Chemical Company under the trade name Latex 512R, and 10 parts of water.

115.0 parts of a pigment dispersion produced according to the pigment dispersion in Example 2 were then slowly added to the water-in-oil styrene-butadiene plasticizer matrix emulsion until the emulsion inverted to an oil-in-water type after which the remaining pigment mix was more rapidly added. The emulsion so prepared was applied to a black paper base and air dried. The coating was pressure sensitive and possessed similar properties to the coating produced according to Example 1.

*Example 5*

A solvent-base formulation was prepared by mixing 9.5 parts of toluene together with 2.3 parts of a triethylene glycol ester of hydrogenated rosin marketed by the Hercules Powder Company under the trade name Staybelite Ester 3, 0.7 part of butyl benzyl phthalate, 6.0 parts of a 25 percent solution in toluene of a polyvinyl acetate homopolymer marketed by the Shawinigan Resins Corp. under the trade name Gelva V–25, and 6.0 parts of a 25 percent solution in toluene of vinyl toluene-butadiene marketed by the Goodyear Tire & Rubber Company under the trade name Pliolite VT together with 3.5 parts of magnesium carbonate.

The above composition was then applied to a black paper base and air dried. The resulting coating was pressure sensitive and possessed similar properties to the paper prepared according to Example 1.

A pressure-sensitive paper was also prepared in the same manner as Example 5 eliminating the 1.5 parts of the polyvinyl acetate homopolymer and substituting therefor an additional 1.5 parts of the vinyl toluene-butadiene resin. The resulting paper when applied to a black paper base was pressure sensitive and possessed substantially the same properties as possessed by the pressure-sensitive paper produced with the polyvinyl acetate homopolymer.

*Example 6*

A solvent-base formulation was prepared by mixing 10 parts of butyl benzyl phthalate together with 2.0 parts of a saturated polyester resin (50 percent solution) marketed by Rohm & Hass Company under the trade name Amberlac 292G, 15.0 parts of a hydrated calcium silicate marketed by the Columbia-Southern Chemical Corp. under the trade name Silene JA, 5.5 parts of an unsaturated thermosetting polyester resin in styrene marketed by Rohm & Haas Company under the trade name Paraplex P–13, and 0.05 part benzoyl peroxide. Enough toluene (approximately 5.0 parts) was then added to the formulation to form a thin paste. The above composition was then applied to a black paper base and air dried. The resulting coating was pressure sensitive and possessed similar properties to the coating produced according to Example 5.

*Example 7*

A resin-plasticizer matrix was prepared in the same manner as set forth in Example 1 using 9.2 parts of toluene N-ethyl sulfonamide marketed by the Monsanto Chemical Company under the trade name Santicizer 8, 0.8 part of an alkaryl polethylene glycol ether (Tergitol NP–14), 10.0 parts of a 10 percent solution of polyvinyl alcohol (Lemol 5–88), 25.0 parts of a 20 percent aqueous solution of trimethylol melamine marketed by the Monsanto Chemical Company under the trade name Resloom HP, and 9.5 parts of a 3 percent aqueous solution of Cyron. 53.0 parts of the satin white pigment dispersion prepared according to Example 2 were then slowly added to the water-in-oil trimethylol melamine-plasticizer matrix emulsion until the emulsion inverted to an oil-in-water type, into which the remaining pigment was more rapidly added.

The coating emulsion so prepared was then applied to a black paper base and air dried. The dried coating was pressure sensitive and possessed similar properties to the paper produced according to Example 6. The pressure-sensitive paper had fair scuff resistance and imaged by compaction. The coating also exhibited a slight hardening effect with prolonged exposure at about 95° C. which was evidenced by a reduction in the coating sensitivity.

*Example 8*

The resin-plasticizer matrix emulsion was prepared in the manner as set forth in Example 1 using 28.5 parts of butyl benzyl phthalate, 1.5 parts of an alkaryl polyethylene glycol, 40 parts of a 10% solution of polyvinyl alcohol (Lemol 5–88), and 10.5 parts of a polyvinyl-acetate homopolymer 55% solids emulsion.

157.0 parts of a pigment dispersion prepared as in Example 2 were added to the above resin-plasticizer matrix emulsion followed by 9.1 parts of a 3% aqueous Cyron solution.

The emulsion so prepared was applied to a black paper base and air dried. The coating was pressure sensitive and possessed similar properties to the coating produced according to Example 1.

*Example 9*

Coating emulsions A, B and C were prepared in a manner such as described in Example 1 except that; in A, 47 parts of calcium stearate were also included in the pigment mixture; in B, 38 parts of magnesium silicate (talc) were also included in the pigment mixture; in C, 38 parts of clay were also included in the pigment mixture. The coating emulsions so prepared were then applied to black base papers and air dried. The resultant pressure-sensitive coated papers all possessed similar properties to those produced according to Example 1 except that these coatings had substantially higher opacity with equivalent or greater sensitivity to pressure.

Variations in the formulations can be made to vary the properties and to obtain the properties desired as will be apparent to those skilled in the art.

We claim:

1. Porous pressure-sensitive, heat-resistant recording material including a base sheet, a normally opaque coating having the property of becoming relatively transparent under writing pressure without becoming relatively transparent under heat up to about the charring temperature of paper, adhered to said base sheet, said coating having finely divided voids and comprising and comprising a matrix of at least one thermoplastic organic resin and a non-volatile, water-insoluble compatible plasticizer for the organic resin having a plasticizer-resin weight ratio of between about 1:3 and 5:1 and a pigment, capable of forming porosity in said coating, having a refractive index substantially the same as said matrix, embedded in said matrix and having a sufficiently large surface area so that it is capable of forming a porous coating, the proportion of said matrix to said pigment being such that the coating is normally opaque but will be rendered transparent when subject to pressure and a surface under said coating contrasting to the color of said pigment.

2. The pressure-sensitive material of claim 1 in which the resin is polyvinyl acetate.

3. The pressure-sensitive material of claim 2 in which the plasticizer is a phthalate plasticizer.

4. The pressure-sensitive material of claim 3 in which the pigment is magnesium carbonate.

5. The pressure-sensitive material of claim 4 in which the pigment-matrix ratio is between about 1:3 to 2.5:1.

6. Porous pressure-sensitive, heat-resistant recording material including a base sheet, a normally opaque coating which is normally insensitive to pressure but having the property of becoming relatively transparent under writing pressure without becoming relatively transparent under heat up to about the charring temperature of paper when the temperature of the coating is raised above room temperature, adhered to said base sheet, said coating having finely divided voids and comprising a matrix of at least one thermoplastic organic resin and a non-volatile, water-insoluble compatible plasticizer for the organic resin which is solid at room temperature but capable of being rendered liquid when heated above room temperature having a plasticizer-resin weight ratio of between about 1:3 and 5:1 and a pigment, capable of forming porosity in said coating, having a refractive index substantially the same as said matrix, embedded in said matrix and having a sufficiently large surface area so that it is capable of forming a porous coating, the proportions of said matrix to said pigment being such that the coating is normally opaque but will be rendered transparent when subjected to pressure at a temperature above room temperature, and a surface under said coating contrasting to the color of said pigment.

7. The porous pressure-sensitive material of claim 6 in which the pigment contains a pigment extender in a minor amount, said pigment extender being easily deformable and being capable of increasing the opacity of the coating when added in a minor amount, but being incapable of forming a porous pressure-sensitive coating when used alone.

8. The porous pressure-sensitive material of claim 7 in which the pigment extender is a member of the group consisting of clay, talc, and calcium stearate.

9. The porous pressure-sensitive material of claim 8 in which the thermoplastic organic resin is polyvinyl acetate.

10. The porous pressure-sensitive material of claim 9 in which a coating of casein is applied to the prorous pressure sensitive coating.

11. The process of making a pressure-sensitive, heat-resistance recording material which includes applying to a base sheet a normally opaque coating having the property of becoming relatively transparent under writing pressure without becoming relatively transparent under heat up to about the charring temperature of paper, said coating having finely divided voids and consisting of a suspension in water of a mixture including a matrix comprising at least one thermoplastic organic resin and non-volatile, water-insoluble compatible plasticizer for the organic resin having a plasticizer-resin weight ratio of between about 1:3 and 5:1 and a pigment having a refractive index substantially the same as said matrix and having a sufficiently large surface area to be capable of producing porous opaque coating when laid down and high transparency when imaged, the proportion of said matrix to said pigment being such that the coating is normally opaque but will be rendered transparent when subjected to pressure, said pigment being of a color contrasting to the apparent color of the surface of said base sheet to which it is applied and drying the coating composition on said base sheet.

12. The process of claim 11 in which the resin is polyvinyl acetate.

13. The process of claim 12 in which the plasticizer is a phthalate plasticizer.

14. The process of claim 13 in which the pigment is magnesium carbonate.

15. The process of claim 14 in which the pigment-matrix ratio is between about 1:3 and 2.5:1.

16. The process of claim 11 in which the pigment contains a pigment extender in a minor amount, said pigment extending being easily deformable and being capable of increasing the opacity of the coating when added in a minor amount, but being incapable of forming the porous pressure sensitive coating when used alone.

17. The process of claim 16 in which the pigment extender is a member of the group consisting of clay, talc, and calcium stearate.

18. The process of claim 17 in which the thermoplastic organic resin is polyvinyl acetate.

19. The process of claim 18 in which a coating of casein is applied to the porous pressure sensitive coating.

20. Porous pressure-sensitive, heat-resistant recording material including a base sheet, a normally opaque coating having the property of becoming relatively transparent under writing pressure without becoming relatively transparent under heat up to about the charring temperature of paper, adhered to said base sheet, said coating having finely divided voids and comprising a matrix of at least one thermoplastic organic resin and a non-volatile water-insoluble compatible plasticizer for the organic resin having a plasticizer-resin ratio of between about 1:3 and 5:1 and a pigment, capable of forming porosity in said coating, having a refractive index substantially the same as said matrix, embedded in said matrix selected from at least one member of the group consisting of silica, calcium silicate, diatomaceous earth, Raffold pigment, hydrated alumina, magnesium carbonate, satin white, magnesium aluminum silicate, sodium aluminum silicate, and flue gas calcium carbonate, the proportion of said matrix to said pigment being such that the coating is normally opaque but will be rendered transparent when subjected to pressure and a surface under said coating contrasting to the color of said pigment.

21. The pressure-sensitive material of claim 3 in which the pigment is satin white.

22. The process of claim 13 in which the pigment is satin white.

23. A pressure sensitive record sheet including a base web and a coating thereon which is white or light colored and substantially opaque except when subjected to local marking pressure which causes the coating to become translucent locally, thus revealing the base web and recording information in the form of contrasting visible marks, the arrangement in which said coating comprises a highly plasticized plastic film-forming composition consisting of a clear, polymeric thermoplastic film-forming material, a solvent-type plasticizer material having the form, when unmixed with said plastic material, of an oily, non-volatile solvent-type liquid, said plasticizer material being compatible with the amount of said thermoplastic material in said plastic composition and being present therein in an amount equal to between one and two parts by weight per part of the dry plastic material and sufficient for placing the thermoplastic material in highly plastic condition and a water-insoluble inorganic finely divided pigment capable of forming porosity in the coating, having a refractive index substantially the same as the plasticized plastic film-forming composition, embedded in said composition, and said pigment being present in said composition in an amount by weight equal to between one and two times the combined weight of said plastic and plasticizer material on a dry basis and such that the coating is normally opaque but will be rendered locally translucent when subjected to local marking pressure.

24. The method of making a pressure sensitive record sheet comprising: applying to a base web at a temperature in the neighborhood of room temperature a coating composition in the form of an aqueous medium, containing in dispersion particles of a clear, polymeric thermoplastic film-forming material and particles of a water-insoluble inorganic finely divided pigment capable of forming porosity in the coating, said aqueous medium having emulsified therein an oily non-voltaile solvent-type liquid plasticizer material which is compatible with the amount of said thermoplastic material in said medium and which is present therein in an amount equal to between one and two parts by weight per part of thermoplastic material particles, said pigment having a refractive index substantially the same as the thermoplastic material when plasticized with said plasticizer in the final dried coating and said pigment being present in said composition in an amount by weight equal to between one and two times the combined weight of said plastic and plasticizer material on a dry basis, and exposing the coating composition applied on said base web to drying conditions to form a thin coating which is dry to the touch, is made coherent and adherent to the base web by the presence of the plastic material and which remains opaque, non-sticky and non-blocking at higher temperatures, said coating being rendered substantially opaque and white by the presence of said pigment but, when subjected to local pressure being caused to become translucent locally, thus revealing the base web and recording information in the form of contrasting visible marks.

25. A coating composition which, as a dried coating is opaque except where modified by local pressure, comprising: an aqueous vehicle, particles of a clear polymeric thermoplastic film-forming material dispersed in said vehicle in a quantity sufficient to render dried coatings, made from the coating composition, coherent and adherent to paper surfaces and to similar base surface; an oily non-volatile, solvent type liquid plasticizer material emulsified in said vehicle, said plasticizer material being compatible with the amount of thermoplastic material in the coating composition and being present therein in an amount equal to between one and two parts by weight per part of thermoplastic material particles; and particles of a water-insoluble inorganic finely divided pigment capable of forming porosity in the coating, and said pigment having a refractive index substantially the same as the thermoplastic material when plasticized with said plasticizer in the final dried coating and said pigment being present in said composition in an amount by weight equal to on a dry basis between about one and two times the combined weight of said plastic and plasticizer materials and being such that the dried coating is normally opaque but will be rendered transparent when subjected to pressure, and said composition being readily capable of application as a coating to base surfaces at ordinary room temperatures and being sufficiently free of heat softening materials to remain opaque, non-sticky, and non-blocking as a dried coating at higher temperatures.

26. A pressure sensitive record sheet including a base web and a coating thereon which is white or light colored and substantially opaque except when subjected to local marking pressure which causes the coating to become translucent locally, thus revealing the base web and recording information in the form of contrasting visible marks, the arrangement in which said coating comprises a highly plasticized plastic film-forming composition consisting of a clear, polymeric thermoplastic film-forming material, a solvent-type plasticizer material having the form, when unmixed with said plastic material, of an oily, non-volatile solvent-type liquid, said plasticizer material being compatible with the amount of said thermoplastic material in said plastic composition and being present therein in an amount equal to between 0.7 and 5 parts by weight per part of the dry plastic material and sufficient for placing the thermoplastic material in highly plastic condition and a water-insoluble inorganic finely divided pigment capable of forming porosity in the coating, having a refractive index substantially the same as the plasticized plastic film-forming composition, embedded in said composition, and said pigment being present in said composition in an amount by weight equal to between about 0.4 and 2.5 times the combined weight of said plastic and plasticizer material on a dry basis and such that the coating is normally opaque but will be rendered locally translucent when subjected to local marking pressure.

27. The method of making a pressure sensitive record sheet comprising applying to a base web at a temperature in the neighborhood of room temperature a coating composition in the form of an aqueous medium, containing in dispersion particles of a clear, polymeric thermoplastic film-forming material and particles of a water-insoluble inorganic finely divided pigment capable of forming porosity in the coating, said aqueous medium having emulsified therein an oily non-volatile solvent-type liquid plasticizer material which is compatible with the amount of said thermoplastic material in said medium and which is present therein in an amount equal to between 0.7 and 5 parts by weight per part of thermoplastic material particles, said pigment having a refractive index substantially the same as the thermoplastic material when plasticized with said plasticizer in the final dried coating and said pigment being present in said composition in an amount by weight equal to between 0.4 and 2.5 times the combined weight of said plastic and plasticizer material on a dry basis, and exposing the coating composition applied on said base web to drying conditions to form a thin coating which is dry to the touch, is made coherent and adherent to the base web by the presence of the plastic material and which remains opaque, non-sticky and non-blocking at higher temperatures, said coating being rendered substantially opaque and white by the presence of said pigment but, when subjected to local pressure being caused to become translucent locally, thus revealing the base web and recording information in the form of contrasting visible marks.

28. A coating composition which, as a dried coating is opaque except where modified by local pressure, comprising an aqeuous vehicle, particles of a clear polymeric thermoplastic film-forming material dispersed in said vehicle in a quantity sufficient to render dried coatings, made from the coating composition, coherent and adherent to paper surfaces and to similar base surface; an oily non-volatile, solvent-type liquid plasticizer material emulsified in said vehicle, said plasticizer material being compatible with the amount of thermoplastic material in the coating composition and being present therein in an amount equal to between 0.7 and 5 parts by weight per part of thermoplastic material particles; and particles of a water-insoluble inorganic finely divided pigment capable of forming porosity in the coating, and said pigment having a refractive index substantially the same as the thermoplastic material when plasticized with said plasticizer in the final dried coating and said pigment being present in said composition in an amount by weight equal to on a dry basis between about 0.4 and 2.5 times the combined weight of said plastic and plasticizer materials and being such that the dried coating is normally opaque but will be rendered transparent when subjected to pressure, and said composition being readily capable of application as a coating to base surfaces at ordinary room temperature and being sufficiently free of heat softening materials to remain opaque, non-sticky, and non-blocking as a dried coating at higher temperatures.

References Cited by the Examiner

UNITED STATES PATENTS

| | | | |
|---|---|---|---|
| 2,739,909 | 3/1956 | Rosenthal | 117—36 |
| 2,848,752 | 8/1958 | Bechtold | 117—36 |
| 2,859,351 | 11/1958 | Clark et al. | 117—36 |
| 2,962,382 | 11/1960 | Ives | 117—36 |

FOREIGN PATENTS 778,353   7/1957   Great Britain.

WILLIAM D. MARTIN, *Primary Examiner.*

RICHARD D. NEVIUS, *Examiner.*

M. KATZ, *Assistant Examiner.*